Patented Apr. 3, 1928.

1,664,481

UNITED STATES PATENT OFFICE.

CLAYTON OLIN NORTH, OF TALMADGE TOWNSHIP, SUMMIT COUNTY, AND WINFIELD SCOTT, OF AKRON, OHIO, ASSIGNORS TO THE RUBBER SERVICE LABORATORIES CO., OF AKRON, OHIO, A CORPORATION OF OHIO.

RUBBER VULCANIZATION ACCELERATOR.

No Drawing.   Application filed December 17, 1924. Serial No. 756,619.

The present invention is directed to the art of vulcanizing rubber and particularly to means whereby the vulcanization process may be accelerated by the employment of a new type of compound heretofore not used for that purpose.

It is well known that hydrogen sulfid will react with aldehyde ammonia to produce thialdine. We have now found that thialdine, as well as other compounds produced by analogous reactions upon the ammonia addition product of other aldehydes, all possess to a marked degree, the property of accelerating the vulcanization of rubber mixes.

Thialdine can be very readily prepared without the necessity of isolating the aldehyde ammonia as an intermediate step, by the following typical method of manufacture. Acetaldehyde is run at a slow rate under a surface of a strong solution of well cooled ammonium hydroxide, and the mixture allowed to stand for a few minutes, whereupon hydrogen sulfid is passed into the solution. Crystals of thialdine slowly separate from the solution. Inasmuch as thialdine melts at a temperature of 43° centigrade, the mixture must be kept thoroughly chilled in order to obtain the material in solid form.

Analogous reaction products may be obtained by employing other aldehydes. Thus, for example, pure croton aldehyde is dissolved in some suitable solvent, such as ether, and dry ammonia gas passed into the solution. Other solvents, such as alcohol may, of course be used, or, if desired, concentrated ammonium hydroxide may be reacted with the croton aldehyde in the absence of solvents. If prepared by this latter method, the aldehyde should be run slowly into the ammonium hydroxide with cooling and with efficient stirring inasmuch as the higher aldehydes and ammonium hydroxide are more or less immiscible. The solution of crotonaldehyde-ammonia is allowed to stand for a short time and hydrogen sulfid is then passed slowly into and through the solution until no more of the gas is absorbed. The reaction product is then separated from the solvent and is then dried to remove any solvent present. The hydrogen sulfid reaction product of other ammonium compounds of such aldehydes as aldol, heptaldehyde, butraldehyde, furfuraldehyde, as well as other aldehydes of the aliphatic series, both saturated and unsaturated and their polymeric forms may be all prepared in a similar manner.

The hydrogen sulfid reaction products of the ammonium compounds of these various aldehydes, we have found possess the property of accelerating the time for vulcanizing rubber mixtures. For example, when 100 parts of smoked sheet rubber, 5 parts of zinc oxide, 3.5 parts of sulfur, and one part of the hydrogen sulfid reaction product of aldehyde ammonia (thialdine) were mixed and vulcanized, a cure was realized after heating for approximately one hour under forty pounds steam pressure per square inch.

Other similar compounds may be used in place of the thialdine in the above formula. Thus, if 100 parts of rubber, 5 parts of zinc oxide, 3.5 parts of sulfur and 1.0 part of the hydrogen sulfid reaction product of crotonaldehyde ammonia are mixed in the usual manner, and vulcanized in a mold at forty pounds steam pressure per square inch, for a period of about one hour, the resulting product has a tensile strength of approximately 3900 pounds per square inch, and an elongation of about 800%. If aldehyde ammonia, a well recognized accelerator, be used in place of and in the same quantity as the above accelerator in the same formula, and treated under like conditions the vulcanized product has a tensile strength of about 3350 pounds per square inch. Thus it is evident that the hydrogen sulfid reaction product of the aldehyde ammonia exerts a more favorable effect on the properties of the vulcanized rubber product than do the aldehyde ammonias of and by themselves.

We may use our new type of accelerators in the manufacture of rubber goods designed for a wide variety of uses. Thus we may prepare a typical tread stock having the following formula 31 parts of smoked sheet rubber, 20 parts of amber crepe rubber, 18 parts of carbon black, 22 parts of zinc oxide, 2 parts of sulfur, 2 parts of hardwood pitch, 1.5 parts of mineral oil (preferably of the light lubricating oil type) 2.5 parts of mineral rubber and 1 part of any of our new type of accelerators, for example, the hydrogen sulfid reaction product of croton-aldehyde. This stock, when vulcanized under forty pounds steam pressure per square inch, gives a good cure after heating for approximately one hour and retains a high modulus without much decrease when the time of heating is increased. In other words the stock does not show the exaggerated tendency to overcure as is shown by rubber compositions containing some types of accelerators.

A hard rubber stock may be prepared by mixing the following materials in the usual manner on the mills: 20 parts of thin brown crepe rubber, 20 parts of smoked sheet rubber, 10 parts of lime, 15 parts of zinc oxide, 20 parts of sulfur, 10 parts of mineral rubber and 1.25 parts of accelerator. As an accelerator we may use any of the hydrogen sulfid reaction products of aldehyde ammonias and we have found that by using the indicated quantity of the hydrogen sulfid reaction product of croton-aldehyde ammonia, in the formula as just given, an excellent hard rubber was obtained after vulcanizing in a press for approximately one hour and forty five minutes under a steam pressure of forty pounds per square inch.

As indicative of the wide scope of our invention, we prepared the hydrogen sulfid reaction product of butraldehyde ammonia and tested the accelerating power of this material in the following formula which is a typical tire friction stock. One hundred parts of smoked sheet rubber, 5 parts of zinc oxide, 3.5 parts of sulfur, and 1.0 part of the hydrogen sulfid reaction product of the butraldehyde ammonia were mixed together in the usual manner. After vulcanizing in molds under a steam pressure of 40 pounds per square inch, a product was obtained after approximately 45 minutes heating that possessed a tensil strength of approximately 4160 pounds per square inch and an elongation of approximately 775%. Other similarly constituted accelerators prepared in the manner described, impart equally desirable properties to practically the same degree to a variety of different types of rubber compounds.

We have set forth in considerable detail a means of preparing the hydrogen sulfid reaction product of a number of different aldehydes, and the use of these materials as rubber vulcanization accelerators in different types of rubber mixes. We do not, however, intend to limit our invention to any specific method of preparation of these compounds, nor to definite amounts of accelerator in the rubber mix, as such factors naturally will vary with the various materials used in the preparation of the accelerators as well as with the various compounding ingredients which may be used in the rubber mix. Nor do we limit our invention by any theory we may have advanced by way of explanation, but we do limit our invention solely by the following claims in which we intend to claim all novelty inherent in our invention and as limited by the prior art.

It is to be understood that other methods than those we have described may be followed in the preparation of our preferred type of accelerators. Thus for example, what we have chosen to call the hydrogen sulfid reaction product of aldehyde ammonias may be prepared also by treating an aldehyde such as heptaldehyde with ammonium sulfid. Other methods of preparing this same type of compounds are apparent to those skilled in the art.

What we claim is:

1. The process of manufacturing vulcanized rubber which comprises plasticizing rubber, adding thereto sulfur, and a small quantity of the hydrogen sulfid reaction product of croton aldehyde ammonia and heating the mixture so formed.

2. The process of manufacturing vulcanized rubber which comprises plasticizing rubber, adding thereto sulfur, and a small quantity of a compound formed by the reaction of hydrogen sulfid upon the ammonia addition product of a straight chain aldehyde and heating the mixture so formed.

3. The process of manufacturing vulcanized rubber which comprises plasticizing rubber, adding thereto sulfur, and a small quantity of a compound formed by the reaction of hydrogen sulfid upon the ammonia addition product of an aliphatic aldehyde and heating the mixture so formed.

4. The process of manufacturing vulcanized rubber which comprises plasticizing rubber, adding thereto sulfur, and a small quantity of a compound formed by passing a current of hydrogen sulfid through an ammoniacal solution of an aldehyde and heating the mixture so formed.

5. The process of manufacturing vulcanized rubber which comprises plasticizing rubber, adding thereto sulfur, and a small quantity of a compound formed by the reaction of hydrogen sulfid upon the ammonia addition product of an unsaturated aldehyde and heating the mixture so formed.

6. A rubber product obtained by vulcanizing a mixture comprising plasticized rubber, a vulcanizing agent and a vulcanization accelerator obtained by the reaction of hydrogen sulfid upon the ammonia addition product of a straight chain aldehyde.

7. A rubber product obtained by vulcanizing a mixture comprising plasticized rubber, a vulcanizing agent and a vulcanization accelerator obtained by the reaction of hydrogen sulfid upon croton aldehyde ammonia.

8. A rubber product obtained by vulcanizing a mixture comprising plasticized rubber, a vulcanizing agent and a vulcanization accelerator obtained by the reaction of hydrogen sulfid upon the ammonia addition product of an aliphatic aldehyde.

9. A rubber product obtained by vulcanizing a mixture comprising plasticized rubber, a vulcanizing agent and a vulcanization accelerator obtained by the reaction of hydrogen sulfid upon an ammoniacal solution of an aldehyde.

10. A rubber product obtained by vulcanizing a mixture comprising plasticized rubber, a vulcanizing agent and a vulcanization accelerator obtained by the reaction of hydrogen sulfid upon the ammonia addition product of an unsaturated aldehyde.

11. The process of manufacturing vulcanized rubber which comprises plasticizing rubber, adding thereto sulphur, and a small quantity of a thialdine compound and heating the mixture so formed.

12. A rubber product product obtained by vulcanizing a mixture comprising plasticized rubber, a vulcanizing agent and a small quantity of a thialdine compounded as an accelerator.

CLAYTON OLIN NORTH.
WINFIELD SCOTT.